United States Patent [19]
Nagasaki et al.

[11] Patent Number: 5,070,594
[45] Date of Patent: Dec. 10, 1991

[54] METHOD OF MAKING AN ACCELERATION SENSOR

[75] Inventors: Wataru Nagasaki; Takuro Endo; Susumu Taira, all of Higashimatsuyama; Hajime Muramatsu, Saitama, all of Japan

[73] Assignee: Diesel Kiki Co., Ltd., Tokyo, Japan

[21] Appl. No.: 682,328

[22] Filed: Apr. 8, 1991

Related U.S. Application Data

[60] Division of Ser. No. 410,722, Sep. 21, 1989, Pat. No. 5,024,087, which is a continuation-in-part of Ser. No. 395,886, Jul. 6, 1989, abandoned.

[30] Foreign Application Priority Data

Jul. 28, 1988 [JP] Japan .............................. 63-99151[U]
Sep. 22, 1988 [JP] Japan .............................. 63-238490

[51] Int. Cl.$^5$ .............................................. H01F 7/06
[52] U.S. Cl. ..................................... 29/602.1; 29/606; 73/516 R
[58] Field of Search .............................. 29/602.1, 606; 73/516 R, 515, 497, 654

[56] References Cited
U.S. PATENT DOCUMENTS

3,195,357 7/1965 Bentley et al. ..................... 73/516 R
4,843,877 7/1989 Kushida et al. ..................... 73/516 R Primary Examiner—Carl E. Hall

[57] ABSTRACT

An acceleration sensor includes a tubular casing having one open and closed by a lid of an elastic material. A magnetic member is received within a sealed space defined by the casing and the lid, and a damper liquid fills in the sealed space. The lid is fixedly connected at its outer peripheral portion to one end portion of the casing including the open end thereof. The lid is deformable away from the other end of the casing so as to absorb a thermal expansion of the damper liquid. The lid has an annular deformable diaphragm portion extending between a central tubular portion of the lid and the outer peripheral portion of the lid. For attaching the lid to the casing, the outer peripheral portion of the lid is pressed into the one end portion of the casing so as to bring the diaphragm portion into contact with the damper liquid, so that part of the damper liquid flows into the tubular portion. Subsequently, an axial bore of the tubular portion is closed by a closure member.

4 Claims, 4 Drawing Sheets

METHOD OF MAKING AN ACCELERATION SENSOR

This application is a division of U.S. Pat. application Ser. No. 07/410,722, filed Sept. 21, 1989, now U.S. Pat. No. 5,024,087, which is a continuation-in-part application of Ser. No. 07/375,886, filed Jul. 6, 1989, now abandoned.

BACKGROUND OF THE INVENTION

This invention relates to a sensor for detecting acceleration and a method of producing such a sensor.

Japanese Laid-Open (Kokai) Patent Application No. 109374/88, filed by the Applicant of this application, discloses an acceleration sensor which comprises a tubular casing, a magnetic member in the form of an iron ball received within the casing, a differential transformer (detection member) mounted externally of the casing, and a ring-shaped permanent magnet disposed externally of the differential transformer to attract the iron ball to a central portion of the differential transformer. The casing, the differential transformer and the permanent magnet are mounted within a body immovably relative to the body. The sensor is mounted on an object to be sensed in such a manner that the axis of the casing coincides with the sensing direction.

In the above conventional acceleration sensor, particularly, the relation between the magnetic force of the permanent magnet and the position of the casing, as well as the relation between the magnetic force of the permanent magnet and the position of the differential transformer, is important. However, intended functions have not always been achieved due to manufacturing errors of the component parts and an error in magnetization of the permanent magnet.

Japanese Laid-Open Patent Application No. 144261/88 and Japanese Laid-Open Utility Model Application Nos. 97862/88, 109654/88 and 129866/88, filed by the Applicant of this application, also disclose acceleration sensors employing a tubular casing, an iron ball, a permanent magnet and a differential transformer. Based on the above five earlier Japanese applications and other applications, a U.S. Pat. application was filed on Oct. 23, 1987 under U.S. Pat. Ser. No. 113,180.

U.S. Pat. Nos. 2,979,959, 4,311,051 and 4,365,513 describe acceleration sensors using an iron ball.

Japanese Laid-Open Patent Application No. 62870/86 discloses a two-dimensional acceleration sensor comprising a pair of permanent magnets disposed respectively on opposite sides of a disc-shaped casing.

Further, U.S. Pat. Nos. 3,100,292 and 4,047,439 and Japanese Laid-Open Patent Application Nos. 203861/85, 233564/85 and 252271/85 disclose acceleration sensors.

However, none of the above-mentioned prior art publications disclose means for adjusting the relative position between the permanent magnet and the casing and the relative position between the permanent magnet and the differential transformer.

In the acceleration sensor disclosed in the above-mentioned Japanese Laid-Open Utility Model Application No. 129866/88 and the above-mentioned U.S. Pat. Ser. No. 113,180 based thereon, a damper liquid is filled in a sealed space provided within the casing. When the acceleration sensor is subjected to acceleration due to vibration, the damper liquid acts on the iron ball and prevents the iron ball from being subjected to resonance. However, some problems have been encountered with this conventional sensor. More specifically, the sealed space within the casing is defined by the casing body with one open end and a rigid lid threadedly connected to the casing body to close the open end of the casing body. Therefore, the thermal expansion of the damper liquid developing with a temperature increase is prevented by the casing body and the lid. Therefore, the pressure within the sealed space increases, and as a result the casing body is subjected to distortion. Particularly when such distortion develops in the casing body in the axial direction thereof, the relative position between the differential transformer and the magnet is changed, so that the relation between the output of the differential transformer and the acceleration is changed, thus failing to achieve a precise detection of the acceleration.

Further, in the acceleration sensor of such a construction, a small amount of the air is inevitably present in the damper liquid within the sealed space. When such small amount of the air moves within the sealed space, the position of the iron ball is slightly changed when the acceleration is either zero or very small, so that the output of the differential transformer is not kept to zero. As a result, the acceleration can not be detected with high precision when the acceleration is either zero or very small. The introduction of the air into the damper liquid is unavoidable with the acceleration sensor of such a construction. The reason is that if the damper liquid is fully filled in the casing body, the lid can not be properly threaded into the open end portion of the casing body. Therefore, the damper liquid is supplied into the casing body to a predetermined liquid level to enable such threaded connection, and in this case even at an initial stage of the threading of the lid into the casing body, the air is entrapped in a space between the lid and the liquid surface of the damper liquid.

SUMMARY OF THE INVENTION

It is therefore an object of this invention to provide an acceleration sensor in which a casing will not be subjected to distortion even when a damper liquid undergoes a thermal expansion.

Another object of the invention is to provide a method of producing an acceleration sensor in which a lid can be attached to the casing in a manner to positively prevent the air from being present in the damper liquid.

According to one aspect of the present invention, there is provided an acceleration sensor comprising:

(a) a tubular casing having one open end and the other closed end;

(b) a lid which sealingly closes the open end of the casing so that the casing defines together with the lid an internal sealed space, the lid being made of an elastic material and being fixedly connected at its outer peripheral portion to one end portion of the casing including the one open end of the casing, and the lid being elastically deformable away from the other end of the casing;

(c) a damper liquid filled in the sealed space;

(d) a magnetic member movably received within the sealed space;

(e) magnetic force-generating means mounted externally of the casing, a magnetic force generated by the magnetic force-generating means holding the magnetic member in a reference position within the casing, and the magnetic member being displaceable from the reference position against the magnetic force of the magnetic force-generating means when the acceleration sensor is subjected to acceleration; and (f) detection means mounted externally of the casing so as to detect displacement of the magnetic member from the reference position.

According to another aspect of the present invention, there is provided a method of producing an acceleration sensor, comprising the steps of:

(a) providing a tubular casing with one open end and the other closed end and also a lid, the lid having an outer peripheral portion, a tubular portion disposed radially inwardly of the outer peripheral portion, and an annular diaphragm portion extending between the outer peripheral portion and one end of the tubular portion;

(b) holding the casing in such a manner that the open end thereof is directed upwardly, and subsequently introducing a magnetic member and a damper liquid into the interior of the casing;

(c) subsequently press-fitting the outer peripheral portion of the lid into one end portion of the casing including the one open end thereof, with the tubular portion directed away from the other end of the casing, so as to bring the diaphragm portion into contact with the damper liquid, so that part of the damper liquid flows into an axial bore of the tubular portion of the lid;

(d) subsequently closing the bore of the tubular portion of the lid;

(e) providing a magnet means for holding the magnetic member in a reference position within the casing, the magnetic member being displaceable from the reference position against a magnetic force of the magnet means when the acceleration sensor is subjected to acceleration; and (f) providing a detection means for detecting displacement of the magnetic member from the reference position.

DESCRIPTION OF THE PREFERRED EMBODIMENTS OF THE INVENTION

A preferred embodiment of the invention will now be described with reference to the drawings.

Figure 1:
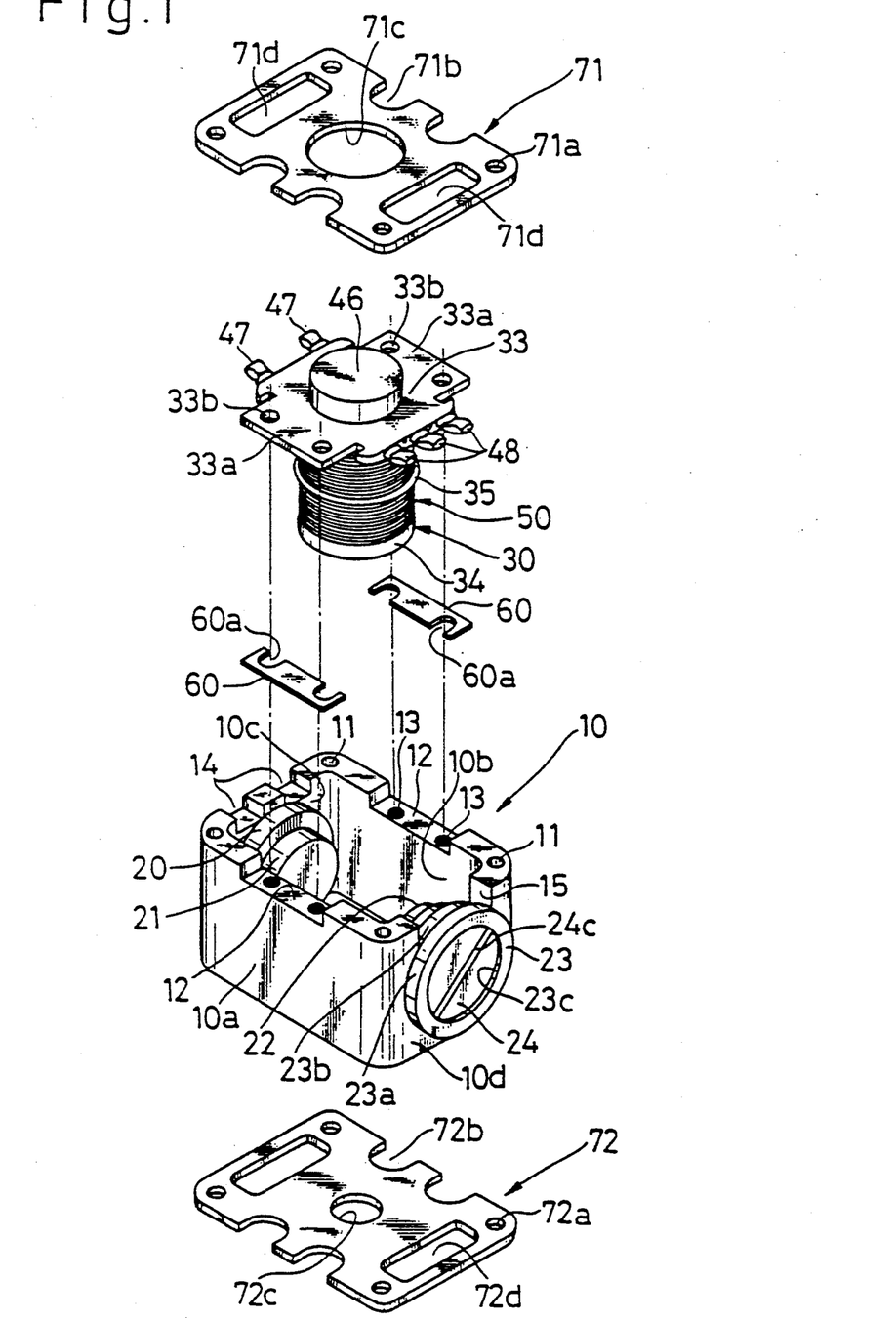
FIG. 1 is an exploded perspective view of an acceleration sensor provided in accordance with the present invention.
Figure 2:
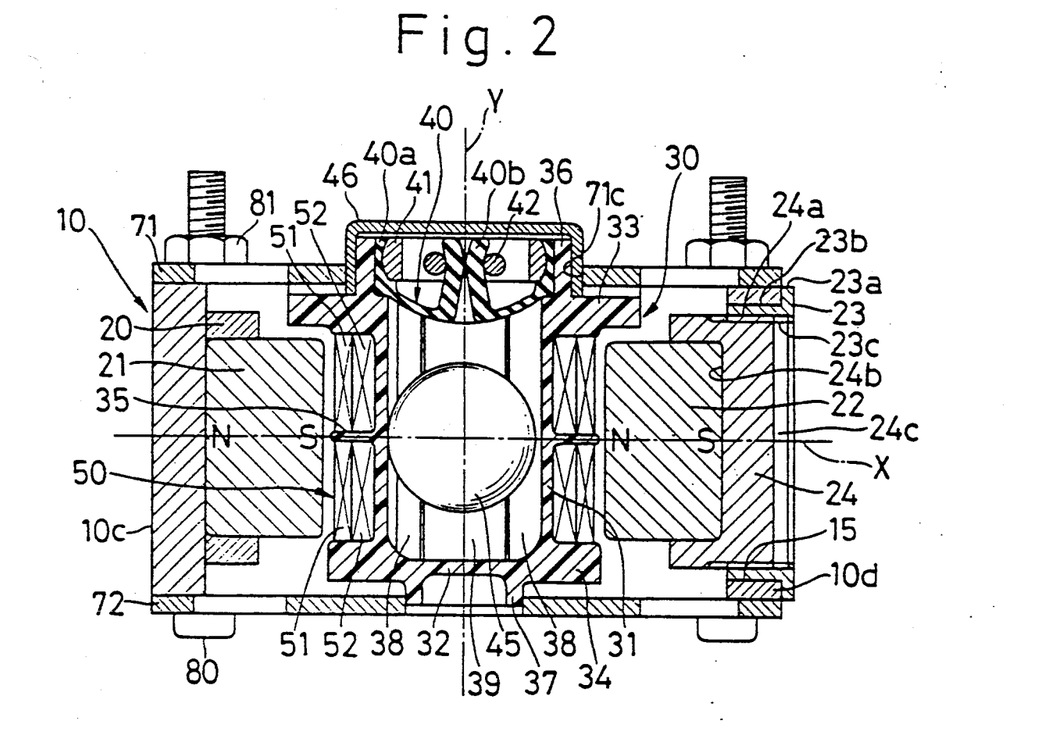
FIGS. 2 and 3 are respectively cross-sectional views taken along lines perpendicularly intersecting each other.
Figure 3:
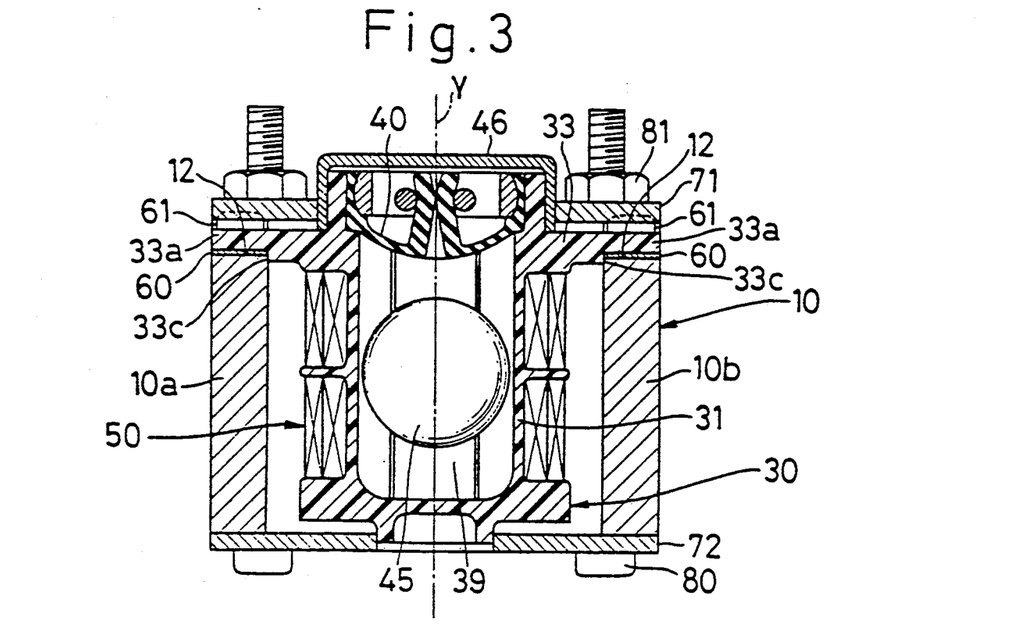

An acceleration sensor shown in FIGS. 1 to 3 broadly comprises a body 10, a pair of permanent magnets 21 and 22 supported on the body 10 in opposed relation to each other, a casing 30 received in the body 10, a differential transformer 50 mounted on the casing 30 and serving as a detection means, a magnetic member 45 in the form of an iron ball received within the casing 30, and a pair of covers 71 and 72 fixedly secured respectively to the upper and lower ends of the body 10.

As shown in FIG. 1, the body 10 has a tubular shape and a rectangular cross-section, the body 10 having a pair of parallel opposed side walls 10a and 10b and another pair of parallel opposed side walls 10c and 10d disposed perpendicular to the side walls 10a and 10b. A hole 11 is formed through each of the four corner portions of the body 10 where the side walls 10a and 10b intersect the side walls 10c and 10d, the hole 11 extending between the upper and lower ends of the body 10. Recesses 12 and 12 are formed in the upper ends or edges of the side walls 10a and 10b, respectively, and two screw holes 13 and 13 are formed in the bottom of each of the two recesses 12 and 12 and are spaced from each other along the side wall 10a (10b). Two recesses 14 and 14 are formed in the upper end or edge of the side wall 10c and are spaced from each other along the side wall 10c. A U-shaped notch 15 is formed in the side wall 10d, the notch 15 opening to the upper end or edge of the side wall 10d.

As shown in FIGS. 1 and 2, a ring-shaped support member 20 is fixedly secured to the inner surface of the side wall 10c of the body 10, and the permanent magnet 21 is partially received fixedly in a recess defined by the side wall 10c and the support member 20. The permanent magnet 21 is of a cylindrical shape, and projects toward the center of the body 10 in such a manner that the axis or center line of the magnet 21 is disposed perpendicular to the side wall 10c and is disposed centrally of the height of the body 10.

As shown in FIGS. 1 and 2, the other permanent magnet 22 is supported on the side wall 10d of the body 10. More specifically, a ring 23 constituting part of the body 10 is fixedly secured to the side wall 10d. The ring 23 has an annular base portion 23b and a peripheral flange 23a formed on the outer periphery of the base portion 23b at one end of the base portion 23b. The ring 23 is fixedly mounted on the body 10 in such a manner that the base portion 23b is snugly fitted in a lower portion of the notch 15, with the flange 23a held against the outer surface of the side wall 10d. Internal threads 23c are formed on the inner peripheral surface of the base portion 23b of the ring 23, and a support member 24 having external threads 24 on its outer peripheral surface is threaded into the annular base 23b, with the external threads 24 threadedly engaging the internal threads 23c. A recess 24b is formed in the inner face or side of the support member 24, and the permanent magnet 22 which is equal in shape and size to the permanent magnet 21 is fixedly fitted in the recess 24b. The permanent magnet 22 is disposed coaxially with the permanent magnet 21, and the common axis of the two permanent magnets 21 and 22 is hereinafter referred to as "X-axis". A groove 24c is formed in the outer face of the support member 24, and by engaging a screw driver in the groove 24c and rotating the screw driver, the support member 24 is moved along the X-axis together with the permanent magnet 22, thus adjusting the position of the permanent magnet 22.

Each of the permanent magnets 21 and 22 is magnetized in the direction of its axis, that is, in the direction of the X-axis, and the opposed end portions of the two magnets are of opposite polarity, as shown in FIG. 2.

As shown in FIGS. 1 to 3, the casing 30 is made of a suitable resin, and has a hollow cylindrical portion 31, an end wall 32 closing the lower end of the cylindrical portion 31, first and second flanges 33 and 34 formed on the outer periphery of the cylindrical portion 31 at its upper and lower ends, respectively, a third flange 35 formed on the outer periphery of the cylindrical portion 31 intermediate the first and second flanges 33 and 34, an annular portion 36 extending upwardly from the upper end of the cylindrical portion 31 in coaxial relation thereto and being greater in diameter than the cylindrical portion 31, and an annular portion 37 extending downwardly from the end wall 32 in coaxial relation to the cylindrical portion 31. A plurality of grooves 38 are formed in the inner peripheral surface of the cylindrical portion 31 and extend in the axial direction of the casing 30. The grooves 38 serve as passages for a damper liquid later described.

The upper open end of the cylindrical portion 31 of the casing 30 is closed by a lid 40 of rubber. The lid 40 has an outer tubular portion 40a and an inner tubular portion 40b. A ring 41 is fitted in the outer tubular portion 40a to press it against the inner periphery of the annular portion 36, thereby fixing the outer tubular portion 40a relative to the annular portion 36. Also, the inner tubular portion 40b is closed by a ring 42 fitted thereon. With this arrangement, a sealed space 39, which is defined by the cylindrical portion 31, the end wall 32 and the lid 40, is provided within the casing 30. The iron ball 45, having a diameter slightly smaller than the inner diameter of the cylindrical portion 31, is received within the sealed space 39, and the damper liquid is filled in the sealed space 39. Although the gap or spacing between the iron ball 45 and the inner peripheral surface of the casing 30 is actually very small, this gap is shown in FIGS. 2 and 3 in an exaggerated manner for illustration purposes. A cap 46 is fitted on the annular portion 36 of the casing 30.

The casing 30 is disposed between the two permanent magnets 21 and 22 and is supported by the body 10. More specifically, as shown in FIGS. 1 and 3, the first flange 33 of the casing 30 has a pair of opposite extensions 33a and 33a extending from its central base portion radially of the cylindrical portion 31. Each extension 33a has two holes 33b and 33b formed therethrough. The lower surface of the extension 33a is stepped to provide a shoulder 33c. The extensions 33a and 33a of the first flange 33 rest respectively on the bottoms of the recesses 12 and 12 in the body 10 through adjustment shims 60 and 60. The lengths of the extension 33a and the recess 12 in the direction of the X-axis are equal to each other, and therefore the positioning of the casing 30 relative to the body 10 in the direction of the X-axis is effected upon engagement of each extension 33a in the recess 12. Also, the shoulders 33c and 33c of the extensions 33a and 33a are held against the inner surfaces of the side walls 10a and 10b of the body 10, respectively, to position the casing 30 in a direction perpendicular to the X-axis. As a result, the axis or center line of the casing 30 substantially coincides with the axis or center line of the body 10. The axis of the casing 30 as well as the axis of the body 10 is indicated by "Y-axis" in FIGS. 2 and 3. The two shims 60 and 60 have the same thickness and each have two notches 60a formed in the inner edge thereof. Screws 61 extend respectively through the holes 33b, formed through the extensions 33a of the first flange 33, and the notches 60a in the adjustment shims 60 and are threaded respectively into the screw holes 13 in the body 10.

As shown in FIG. 1, two terminals 47 and three terminals 48 are respectively formed on and extend outwardly from the opposite edges of the first flange 33 of the casing 30 disposed adjacent to the extensions 33a. The two terminals 47 are partially received respectively in the two recesses 14 formed in the body 10. The three terminals 48 are partially received in the notch 15 formed in the body 10.

The differential transformer 50 is mounted around the cylindrical portion 31 of the casing 30. More specifically, a secondary coil 52 is wound around that portion of the cylindrical portion 31 extending between the third flange 35 and the first flange 33, and a primary coil 51 is wound around the secondary coil 52. Similarly, an inner secondary coil 52 and an outer primary coil 51 are wound around that portion of the cylindrical portion 31 extending between the third flange 35 and the second flange 34. The two primary coils 51 and 51 are composed of a continuous single electric wire, and the opposite ends of this electric wire are connected to an oscillator (not shown) through the terminals 47 and 47. One ends of the secondary coils 52 and 52 are connected together in a differential fashion through the central one of the terminals 48 whereas the other ends of the secondary coils are connected to a detection circuit (not shown) through the other two terminals 48.

The center of the differential transformer 50 in the direction of the Y-axis is at substantially the same level as the X-axis.

As shown in FIG. 1, a hole 71a is formed through each of the four corners of the cover 71, and similarly a hole 72a is formed through each of the four corners of the cover 72. The covers 71 and 72 are fixedly secured to the body 10 by bolts 80, passing through the holes 72a, the holes 11 (formed through the body 10) and the holes 71a, and nuts 81 threaded respectively on the bolts 80 (see FIG. 3). Notches 71b are formed in the opposed edges of the cover 71 extending in the X-axis direction, and similarly notches 72b are formed in the opposed edges of the cover 72 extending in the X-axis direction. The notches 71b receive the heads of the screws 61, respectively. The covers 71 and 72 have respective circular central holes 71c and 72c formed therethrough. The cap 46 for the casing 30 is received in the circular hole 71c of the upper cover 71, and the annular portion 37 of the casing 30 is received in the circular hole 72c of the lower cover 72. A pair of rectangular holes 71d are formed through the upper cover 71 and disposed respectively on the opposite sides of the circular hole 71c in the X-axis direction. Similarly, a pair of rectangular holes 72d are formed through the lower cover 72 and disposed respectively on the opposite sides of the circular hole 72c in the X-axis direction. The electric wires connected to the terminals 47 and 48 pass through the rectangular holes 71d of the upper cover 71 and are led to the oscillator and the detection circuit.

The support members 20 and 24 respectively supporting the pair of permanent magnets 21 and 22, the ring 23, the body 10 and the covers 71 and 72 are made of iron, and jointly constitute a magnetic circuit for the permanent magnets 21 and 22. This magnetic circuit is substantially symmetrical with respect to a horizontal plane in which the X-axis lies, and is also substantially symmetrical with respect to a vertical plane disposed perpendicular to the sheet of FIG. 2 and including the Y-axis therein. Magnetic lines of force are produced between the two permanent magnets 21 and 22 and pass through the iron ball 45.

The acceleration sensor of the above construction is mounted on an object to be sensed in such a manner that the axis (i.e., the Y-axis) of the casing 30 extends in the sensing direction.

A high-frequency AC voltage is applied from the above-mentioned oscillator to the primary coils 51 and 51 of the differential transformer 50, so that a high-frequency AC voltage, produced in the secondary coils 52 and 52 as a differential output, is fed to the detection circuit. In the detection circuit, the differential output is subjected to synchronous rectification, and the high-frequency components are removed from the differential output, and a DC voltage of a predetermined level (i.e., a reference voltage) is applied to the differential output to thereby produce a detection output. This detection output contains information indicative of whether the detection output represents acceleration or deceleration and also contains information indicative of the level of such acceleration or deceleration.

When the acceleration sensor is subjected to no acceleration (that is, the sensor is in a stationary condition or in uniform motion), the iron ball 45 is held stationary under the attracting forces of the permanent magnets 21 and 22. This stationary position is hereinafter referred to as "reference position". In the reference position, the amplitude of the differential output from the differential transformer 50 is ideally zero, and the detection output is equal to the reference voltage.

When the acceleration sensor is in accelerating motion or decelerating motion in the direction of the Y-axis, the iron ball 45 is subjected to an inertia force in a direction opposite to the acceleration direction or the deceleration direction, so that the iron ball 45 is moved in the Y-axis direction until the inertia force balances the forces exerted by the permanent magnets 21 and 22 on the iron ball 45 in the Y-axis direction. The differential transformer 50 feeds a differential output of an amplitude corresponding to the amount of displacement of the iron ball 45 from its reference position in the Y-axis direction, and in accordance with this differential output, the detection circuit produces a detection voltage deviated from the reference voltage.

Even when the acceleration is zero as described above, the detection voltage actually varies slightly from the reference voltage, that is, above or below the reference voltage. The reason why the detection voltage is subjected to such variation will now be described. The diameter of the iron ball 45 is slightly smaller than the inner diameter of the casing 30, and therefore the iron ball 45 is disposed in point contact with the inner surface of the casing 30. The iron ball 45 undergoes oppositely-directed radial forces exerted respectively by the permanent magnets 21 and 22, and is held in contact with one of two those portions of the inner peripheral surface of the casing 30 disposed close to the permanent magnets 21 and 22, respectively. The force (i.e., contact force) under which the iron ball 45 is held against the inner surface of the casing 30 is determined by a difference between the above radial forces exerted respectively by the permanent magnets 21 and 22. The iron ball 45 is subjected to a frictional resistance force (in the axial direction of the casing 30) determined by the product of the above contact force and the friction coefficient of the inner surface of the casing 30. Therefore, even when the acceleration is zero, the iron ball 45 is caused to stop at a position where the forces exerted by the permanent magnets 21 and 22 in the axial direction of the casing 30 balances the frictional resistance force. Thus, the iron ball 45 does not return to the reference position where the value of the differential transformer is substantially zero, and the iron ball 45 is displaced slightly from the reference position within a certain range. As a result, the amplitude of the differential output of the differential transformer 50 fails to be accurately zero.

In order to keep variations in the detection output (which variations occur when the acceleration is zero as described above) to within an acceptable range, it is necessary that regardless of the position of contact of the iron ball 45 with the inner surface of the casing 30, the contact force, i.e., a difference between the magnetic forces of the permanent magnets 21 and 22 acting radially of the iron ball 45, should be as small as possible to thereby reduce the frictional resistance force acting on the iron ball 45.

To achieve this, the following requirements must be met. Namely, a first requirement is that the intensities of the magnetic fields produced respectively by the permanent magnets 21 and 22 are equal to each other in the Y-axis (i.e., the axis or center line of the casing 30). A second requirement is that a difference between the diameter of the iron ball 45 and the inner diameter of the casing 30 should be as small as possible.

When the first requirement is met, the force of contact of the iron ball 45 with that portion of the inner surface of the casing 30 disposed close to the permanent magnet 21 is equal to the force of contact of the iron ball 45 with that portion of the inner surface of the casing 30 disposed close to the other permanent magnet 22. When the first and second requirements are met, the forces, exerted respectively by the permanent magnets 21 and 22 on the iron ball 45 in its radial directions, mostly cancel each other regardless of whether the iron ball 45 is held in contact with one or the other of the above-mentioned two portions of the inner surfaces of the casing 30 disposed close to the permanent magnets 21 and 22, respectively. As a result, the iron ball 45 is subjected to a small contact force, so that the frictional resistance is reduced, thereby keeping, to within a small range, a variation in the amount of displacement of the iron ball 45 from the reference position when the acceleration is zero.

The second requirement can be met relatively easily. With the conventional acceleration sensors, although the first requirement is met at the stage of design, this can not actually be easily done due to manufacturing errors of the component parts and errors in the magnetic forces of the permanent magnets 21 and 22. In this embodiment, however, the first requirement can be easily met by rotating the support member 24 to finely move the same in the direction of the X-axis to thereby adjust the position of the permanent magnet 22 in the same direction.

The position adjustment of the permanent magnet 22 will now be described in detail. First, after the acceleration sensor is shook with the hand or is subjected to vibration, the acceleration sensor is allowed to be stationary, and then either the amplitude of the differential output of the differential transformer 50 or the amount of displacement of the detection output from the reference voltage is observed. Then, the position of the permanent magnet 22 in the direction of the X-axis is adjusted. This procedure is repeated until the position of the permanent magnet 22 is so adjusted as to reduce the above displacement amount to a minimum.

After effecting the above position adjustment, an adhesive or the like may be applied to the marginal portion of the outer surface of the support member 24 and that portion of the internally-threaded portion 23c of the ring 23 disposed adjacent to the above marginal portion, so as to prohibit the support member 24 from rotation.

In this embodiment, also, by adjusting the thickness of the adjustment shims 60 and 60, the position of the casing 30 is adjusted in the direction of the Y-axis so that the magnetic center of the differential transformer 50 can coincide with the reference position of the iron ball 45 determined by the permanent magnets 21 and 22. Referring to the term "the magnetic center of the differential transformer 50", when the iron ball 45 is positioned at this magnetic center, the differential output is theoretically zero. With this arrangement, the relation between the acceleration and the detection output is constant.

The manner of adjusting the position of the casing 30 will now be described in detail. There are provided shims 60 of various thicknesses. Among these, shims 60 and 60 of a certain thickness are selected, and the casing 30 is fixedly secured to the body 10 by the screws 61 through the thus selected shims 60 and 60. In this condition, the acceleration sensor is shook and then is allowed to be stationary, and then either the amplitude of the differential output of the differential transformer 50 or the amount of displacement of the detection output from the reference voltage is detected. This procedure is repeated until the shims 60 and 60 of the optimum thickness are selected in order to reduce the above displacement amount to a minimum. Since the adjustment shims 60 and 60 have the notches 60a, the shims can be easily exchanged merely by loosening the screws 61, and therefore this adjustment can be carried out efficiently.

There are occasions when the magnets 21 and 22 is out of alignment with its geometric axis. In such a case, when the permanent magnet 22 is rotated to be moved in the X-axis direction to effect its position adjustment, the magnetic center line of the permanent magnets 21 and 22 is displaced in the direction of the Y-axis, so that the reference position of the iron ball 45 is displaced in the direction of the Y-axis. Therefore, it is preferred that the position adjustment of the casing 30 in the direction of the Y-axis should be carried out after the position adjustment of the permanent magnet 22, because this ensures that the reference position of the iron ball 45 can be positively caused to coincide with the magnetic center of the differential transformer 50.

In the case where the axis or center line of the casing 30 is disposed vertically, the reference position of the iron ball 45 is displaced slightly below the position at which the iron ball 45 would be located by the attracting forces of the permanent magnets 21 and 22 unless the iron ball 45 is not subjected to the influence of gravity. This displacement of the iron ball 45 due to gravity can be compensated for by the position adjustment of the casing 30. Therefore, regardless of whether the axis of the casing 30 is disposed vertically or horizontally, variations in the detection output can be eliminated.

According to a modified form of the invention, by adjusting the position of the permanent magnet 22 in the direction of the X-axis, the intensities of the magnetic fields of the permanent magnets 21 and 22 may be different from each other by a predetermined amount at the axis or center line of the casing 30. With this arrangement, the iron ball 45 is always held against that portion of the inner surface of the casing 30 which is disposed close to that permanent magnet having a greater magnetic force at the axis of the casing 30, thereby stabilizing the iron ball 45. In such a case, it is preferred that the difference between the intensities of the magnetic fields of the permanent magnets 21 and 22 at the axis or centerline of the casing 30 should be so small that the force exerted by one of the two permanent magnets 21 and 22 on the iron ball 45 in one radial direction of the iron ball 45 can cancel, as much as possible, the force exerted by the other permanent magnet on the iron ball 45 in the opposite radial direction of the iron ball 45.

Figure 4:
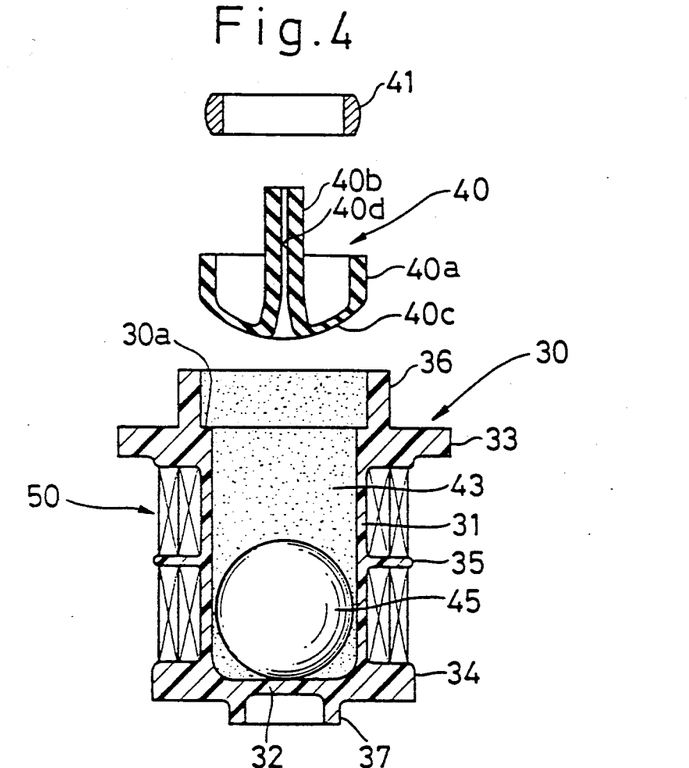
FIGS. 4 to 6 are cross-sectional views of the acceleration sensor, showing the sequence of attachment of a lid to a casing.
Figure 5:
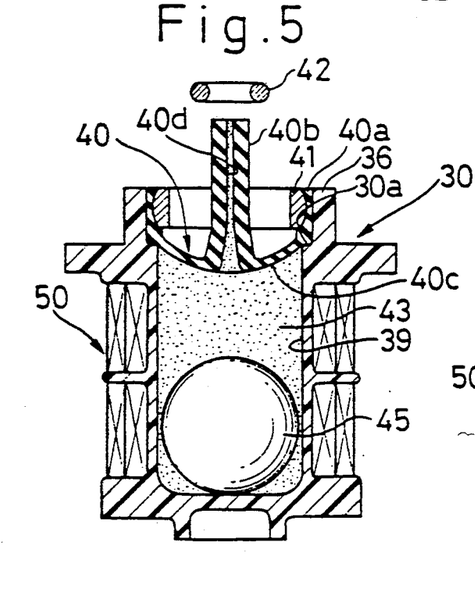

Next, the lid 40 attached to the casing 30 as well as the outer and inner rings 41 and 42 will now be described. As best shown in FIG. 4, the outer peripheral surface of the outer ring 41 is accurately convex. As best shown in FIG. 5, the inner ring 42 has a circular cross-section. Formed between the inner surface of the tubular portion 31 of the casing 30 and the inner surface of the annular portion 36 is an annular shoulder 30a which interconnects these two inner peripheral surfaces and faces away from the end wall 32.

The lid 40 has an annular diaphragm portion 40c interconnecting the outer and inner tubular portions 40a and 40b at their lower ends over the entire circumferences thereof. Thus, the annular diaphragm portion 40c serves as a bottom portion of the lid 40. The diaphragm portion 40c is slightly smaller in thickness than the outer and inner tubular portions 40a and 40b. The diaphragm portion 40c projects downwardly from the lower end of the outer tubular portion 40a. The inner tubular portion 40b is longer in its original form (FIGS. 4 and 5) than in its final form (FIGS. 2 and 3). The inner diameter of the outer tubular portion 40a is smaller than the greatest outer diameter of the outer ring 41, and the outer diameter of the outer tubular portion 40a is greater than the inner diameter of the annular portion 36 of the casing 30. The outer diameter of the inner tubular portion 40b is greater than the inner diameter of the inner ring 42, and the double of the thickness of the inner tubular portion 40b is greater than the inner diameter of the inner ring 42. The inner tubular portion 40b has a relatively narrow axial bore 40d therethrough which serves as a passage for flowing the damper liquid 43 therethrough, as described later.

A method of attaching the lid 40 to the casing 30 will now be described. As shown in FIG. 4, the differential transformer 50 is beforehand mounted on the outer periphery of the casing 30. The iron ball 45 is received within the casing 30 with the open end of the casing 30 directed upwardly, and the damper liquid 43 such as silicone oil is filled in the interior of the casing 30 up to a level of the upper end of the annular portion 36.

As shown in FIG. 5, the outer ring 41 is fitted in the outer tubular portion 40a of the lid 40, and then the lid 40 with the outer ring 41 is pressed into the annular portion 36 of the casing 30 until the lower end of the outer tubular portion 40a is brought into firm contact with the annular shoulder 30a of the casing 30. As a result, as shown in FIG. 5, the outer tubular portion 40a of the lid 40 is strongly compressed between the inner peripheral surface of the annular portion 36 and the outer peripheral surface of the outer ring 41. Therefore, the lid 40 is fixed relative to the casing 30, and a seal is formed between the outer tubular portion 40a of the lid 40 and the annular portion 36 of the casing 30.

In the above method, when the lid 40 is moved downwardly toward the shoulder 30a, the downwardly-projecting diaphragm portion 40c is first brought into contact with the damper liquid 43 within the interior of the casing 30, so that the damper liquid 43 flows over the upper end or edge of the annular portion 36. When the lid 40 is further moved downwardly, the lower end of the outer tubular portion 40a is brought into contact with the upper end of the annular portion 36 to prevent the damper liquid 43 from flowing over the upper end of the annular portion 36. When the lid 40 is further moved downwardly, the damper liquid 43 is caused to flow upwardly through the bore 40d of the inner tubular portion 40b, and is discharged to the exterior from the upper end of the bore 40d. Thus, during the time when the lid 40 is press-fitted into the casing 30, the air is not interposed between the lid 40 and the liquid surface of the damper liquid 43. Therefore, when the lid 40 is completely pressed into the casing, the air is not present in the sealed space 39, and the damper liquid 43 is filled in the sealed space 39 and the bore 40d up to the upper end of the inner tubular portion 40b.

Then, the inner ring 42 is fitted on the upper end of the inner tubular portion 40b of the lid 40, and subsequently the inner ring 42 is moved downwardly along the inner tubular portion 40b to a level lower than the upper end of the casing 30, while holding the upper end of the inner tube portion 40b by either the hand of the operator or a suitable jig. Then, the inner tubular portion 40b is cut or severed at a level above and adjacent to the inner ring 42. That portion of the inner tubular portion 40b on which the inner ring 42 is fitted is radially inwardly compressed to close the bore 40d.

Figure 6:
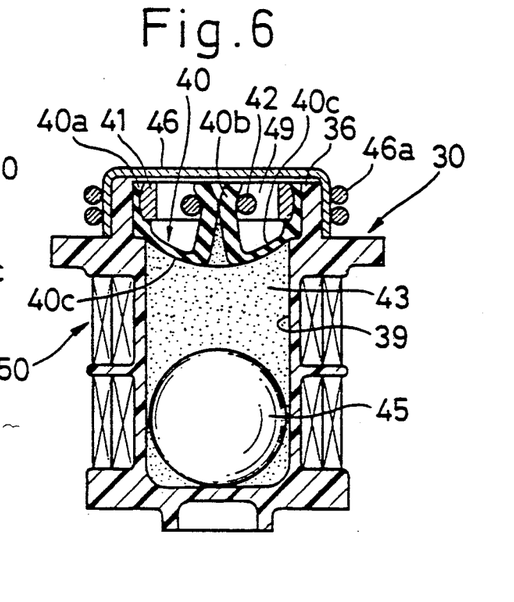

After the lid 40 is attached to the casing 30 as described above, the cap 46 is fitted on the annular portion 36 of the casing 30 as shown in FIG. 6. The cap 46 is made of a resin, and is relatively thin. A helical spring 46a is fitted on the cap 46a to fix the cap 46a to the outer peripheral surface of the annular portion 36. An air chamber 49 is formed between the upper portion of the cap 46 and the diaphragm portion 40c of the lid 40.

The body 10 in which the casing 30 is mounted is received in a housing (not shown), and thereafter an epoxy resin is filled in a space formed between the housing and the body 10. At this time, the cap 46 prevents the epoxy resin from intruding into the air chamber 49, so that the air chamber 49 remains intact.

In the construction illustrated, when the damper liquid 43 expands with a temperature increase, the diaphragm portion 40c of the lid 40 made of rubber is elastically deformed outwardly toward the air chamber 49 in accordance with the degree of such thermal expansion of the damper liquid 43. Therefore, the pressure within the sealed space 39 will not increase, and hence the casing 30 will not be subjected to distortion. Such distortion would occur in the prior art in accordance with the temperature increase. Thus, in the construction illustrated, the relative position between the differential transformer 50 and each of the permanent magnets 21 and 22 will not be changed, thus positively maintaining the relation between the acceleration and the differential output in a predetermined condition.

Since the air is not present in the damper liquid 43, the position of iron ball 45 will not be changed when the acceleration is zero. Therefore, the differential output available when the acceleration is zero can be close to zero.

Figure 7:
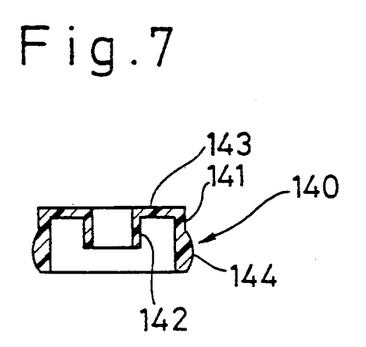
FIG. 7 is a perspective view of a compressing member employed in a modified acceleration sensor.
Figure 8:
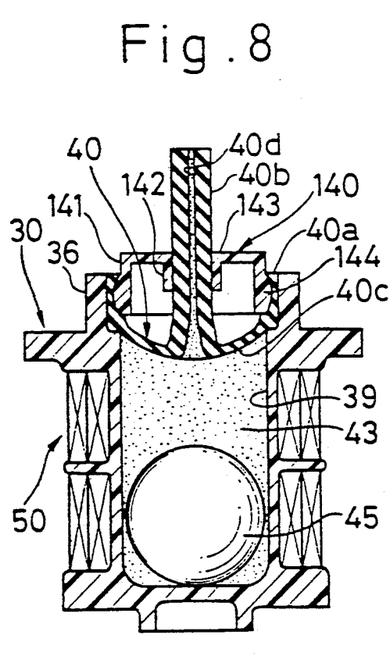
FIGS. 8 and 9 are cross-sectional views of the modified acceleration sensor, showing the sequence of attachment of the lid to the casing.
Figure 9:
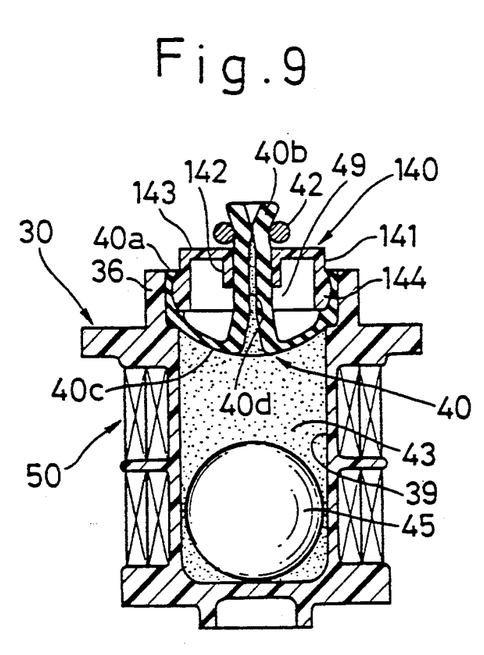

FIGS. 7 to 9 show a modified form of the invention, and those parts of this embodiment corresponding to those of the preceding embodiment of FIGS. 1 to 6 will be denoted by the same reference numerals, respectively, and will not be described further. A compressing member 140 shown in FIG. 7 is made of a resin, and performs the functions of the outer ring 41 and cap 46 of the preceding embodiment of FIGS. 1 to 6. More specifically, the compressing member 140 includes an outer tubular wall 141, an inner tubular wall 142 disposed in concentric relation to the outer tubular wall 141, and a disc-shaped flat upper wall 143 having a central hole and interconnecting the outer and inner tubular walls 141 and 142 at their upper ends. The outer peripheral surface of the outer tubular wall 141 is bulged radially outwardly at its lower portion to provide a compressing portion 144. The outer peripheral surface of the compressing portion 144 is arcuately convex.

In this embodiment, when the lid 40 is to be attached to the casing 30, the compressing portion 144 of the compressing member 140 is first pressed into the outer tubular portion 40a of the lid 40, and at the same time the inner tubular wall 142 of the compressing member 140 is fitted on the inner tubular portion 40b of the lid 40. At this time, the outer tubular portion 40a is elastically deformed radially outwardly by the compressing portion 144. Since the outer diameter of the inner tubular portion 40b is substantially equal to the inner diameter of the inner tubular wall 142, the inner tubular portion 40b is not compressed or squeezed by the inner tubular wall 142. Then, as shown in FIG. 8, the outer tubular portion 40a of the lid 40 is pressfitted into the annular portion 36 of the casing 30, together with the compressing portion 144 of the compressing member 140, so that part of the damper liquid 43 is discharged to the exterior through the bore 40d of the inner tubular portion 40b, as described above in the preceding embodiment. In this condition, the outer tubular portion 40a of the lid 40 is compressed between the annular portion 36 of the casing 30 and the compressing portion 144 of the compressing member 140. Then, as shown in FIG. 9, the ring 42 is fitted on the inner tubular portion 40b of the lid 40 to close the bore 40d, and then the upper portion of the inner tubular portion 40b is cut off as described above. In this embodiment, an air chamber 49 is formed by the compression member 140 and the lid 40.

While the acceleration sensors according to the present invention have been specifically shown and described herein, the invention itself is not to be restricted to the exact showing of the drawings or the description thereof, and various modifications can be made.

For example, in the above two embodiments shown in FIGS. 1 to 6 and FIGS. 7 to 9, the use of the ring 42 may be omitted, in which case the inner tubular portion 40b is pressed radially inwardly and fused by a press tool heated to an elevated temperature to close the bore 40d of the inner tubular portion 40b. In this case, the thus fused portion of the inner tubular portion 40b constitutes a closure means.

Also, in the above two embodiments, although the damper liquid 43 is beforehand filled in the interior of the casing 30 up to the upper end of the annular portion 36, the liquid level or surface of the damper liquid 43 may be lower than the upper end of the annular portion 36. In this case, the liquid level of the damper liquid 43 is so predetermined that before the lower end of the outer tubular portion 40a of the lid 40 reaches the upper end of the annular portion 36, the liquid damper 43 is caused by the diaphragm portion 40c to flow over the upper end of the annular portion 36. This ensures that the air is prevented from remaining in the sealed space 39.

The lower ends of the outer and inner tubular portions 40a and 40b of the lid 40 may be at the same level so that diaphragm portion 40c can be generally flat so as to be disposed at the same level as the lower ends of the outer and inner tubular portions 40a and 40b. Alternatively, the lower end of the inner tubular portion 40b is at a level above the lower end of the outer tubular portion 40a, so that the diaphragm portion 40c may be recessed toward the open end of the casing 30. In these cases, when the lid 40 is to be attached to the casing 30, the damper liquid 43 does not flow over the upper end of the annular portion 36 of the casing, but flows over the upper end of the inner tubular portion 40b of the lid 40. Also, in these cases, the liquid level of the damper liquid 43 before attaching the lid 40 to the casing 30 may be so determined that when the lid 40 is completely pressed into the one end portion of the casing 30, the damper liquid 43 flows along the bore 40d of the inner tubular portion 40b up to either the upper end of the inner tubular portion 40b or a point intermediate opposite ends of the inner tubular portion 40b. In this case, the bore 40d is closed at a position below the liquid level of the damper liquid in the bore 40d.

One or more than two magnets may be used to produce the magnetic fields. Also, annular magnets may be used.

The magnetic member may be in the form of a rigid cylindrical member of a magnetic material or in the form of a magnetic fluid comprising a colloid-like liquid having particles of a ferromagnetic material dispersed in a solvent.

Instead of the transformer, the detection means may comprise capacitors each mounted on the outside of the casing and having a pair of electrode plates. In this case, the displacement of the magnetic member is detected in terms of a variation in electric capacity.

The permanent magnets may be replaced by electromagnets. In this case, the detection output of the detection means may be fed back to a control circuit which functions to control the supply voltage of the electromagnets, thereby controlling the supply voltage of the electromagnets so that the magnetic member is always located in the reference position. Since the acceleration corresponds to this supply voltage, the acceleration is determined by the supply voltage.

The above sensors can be used as sensors for detecting the inclination of an object.

What is claimed is:

1. A method of producing an acceleration sensor, comprising the steps of:
   (a) providing a tubular casing with one open end and the other closed end and also a lid, said lid having an outer peripheral portion, a tubular portion disposed radially inwardly of said outer peripheral portion, and an annular diaphragm portion extending between said outer peripheral portion and one end of said tubular portion;
   (b) holding said casing in such a manner that said open end thereof is directed upwardly, and subsequently introducing a magnetic member and a damper liquid into the interior of said casing;
   (c) subsequently press-fitting said outer peripheral portion of said lid into one end portion of said casing including said one open end thereof, with said tubular portion directed away from said other end of said casing, so as to bring said diaphragm portion into contact with said damper liquid, so that part of said damper liquid flows into an axial bore of said tubular portion of said lid;
   (d) subsequently closing said bore of said tubular portion of said lid;
   (e) providing a magnet means for holding said magnetic member in a reference position within said casing, said magnetic member being displaceable from said reference position against a magnetic force of said magnet means when said acceleration sensor is subjected to acceleration; and
   (f) providing a detection means for detecting displacement of said magnetic member from said reference position.

2. A method according to claim 1, in which said press-fitting step comprises fitting an annular compressing member into said outer peripheral portion of said lid, and subsequently press-fitting said outer peripheral portion of said lid into said one end portion of said casing, together with said compressing member, so that said outer peripheral portion of said lid is compressed between said one end portion of said casing and said compressing member.

3. A method according to claim 1, in which a liquid level of said damper liquid within said casing is so determined that when said outer peripheral portion of said lid is press-fitted into said casing, part of said damper liquid flows over the other end of said tubular portion of said lid through said bore thereof.

4. A method according to claim 1, in which a liquid level of said damper liquid within said casing is so determined that when said outer peripheral portion of said lid is press-fitted into said casing, said diaphragm portion is brought into contact with said damper liquid before said diaphragm portion is brought into contact with said one end portion of said casing, so that part of said damper liquid flows over said one end portion of said casing.

* * * * *